United States Patent [19]

Dillberg

[11] 4,083,116
[45] Apr. 11, 1978

[54] TRANSFER GAGE

[76] Inventor: Raymond E. Dillberg, 8916 Longden Ave., Temple City, Calif. 91780

[21] Appl. No.: 669,225

[22] Filed: Mar. 22, 1976

[51] Int. Cl.² ............................................. G01B 3/56
[52] U.S. Cl. .................................. 33/174 M; 33/112
[58] Field of Search ................... 33/75 R, 112, 174 M, 33/93, 174 R, 174 S

[56] References Cited

U.S. PATENT DOCUMENTS

| 101,477 | 4/1870 | Littlefield | 33/115 |
|---|---|---|---|
| 635,050 | 10/1899 | MacFarren | 33/112 |
| 2,570,430 | 10/1951 | Cramer | 33/370 |
| 2,703,458 | 3/1955 | Fitzpatrick | 33/174 S |
| 2,715,278 | 8/1955 | Harrison | 33/112 |
| 2,745,183 | 5/1956 | Queen | 33/112 X |
| 2,971,261 | 2/1961 | Michie | 33/112 |
| 3,067,518 | 12/1962 | Herman | 33/112 |

FOREIGN PATENT DOCUMENTS 9,429 of 1907 United Kingdom ............... 33/143 J

*Primary Examiner*—Harry N. Haroian
*Attorney, Agent, or Firm*—Boniard I. Brown

[57] ABSTRACT

The included angle between two flat relatively angularly disposed surfaces of a workpiece is measured with the aid of a transfer gage having a base pivotally mounting, on a pivot axis parallel to a surface of the base, a transfer gage member, such as a transfer plate, with a work engaging edge means and a gaging edge disposed in planes parallel to the pivot axis and in precise known angular relationship to one another. The workpiece and transfer gage are placed on a flat supporting surface, such as a precision surface plate, with one surface of the workpiece and the base surface of the gage resting on the supporting surface and with the work engaging edge means of the transfer gage member seating flat against the other workpiece surface, whereby the angle of the gaging edge of the gage member relative to the supporting surface bears a known relation to the included angle between the workpiece surfaces. The included angle is determined by measuring this gaging edge angle, as by running along the edge the plunger of a dial gage supported in predetermined relation to the supporting surface.

2 Claims, 6 Drawing Figures

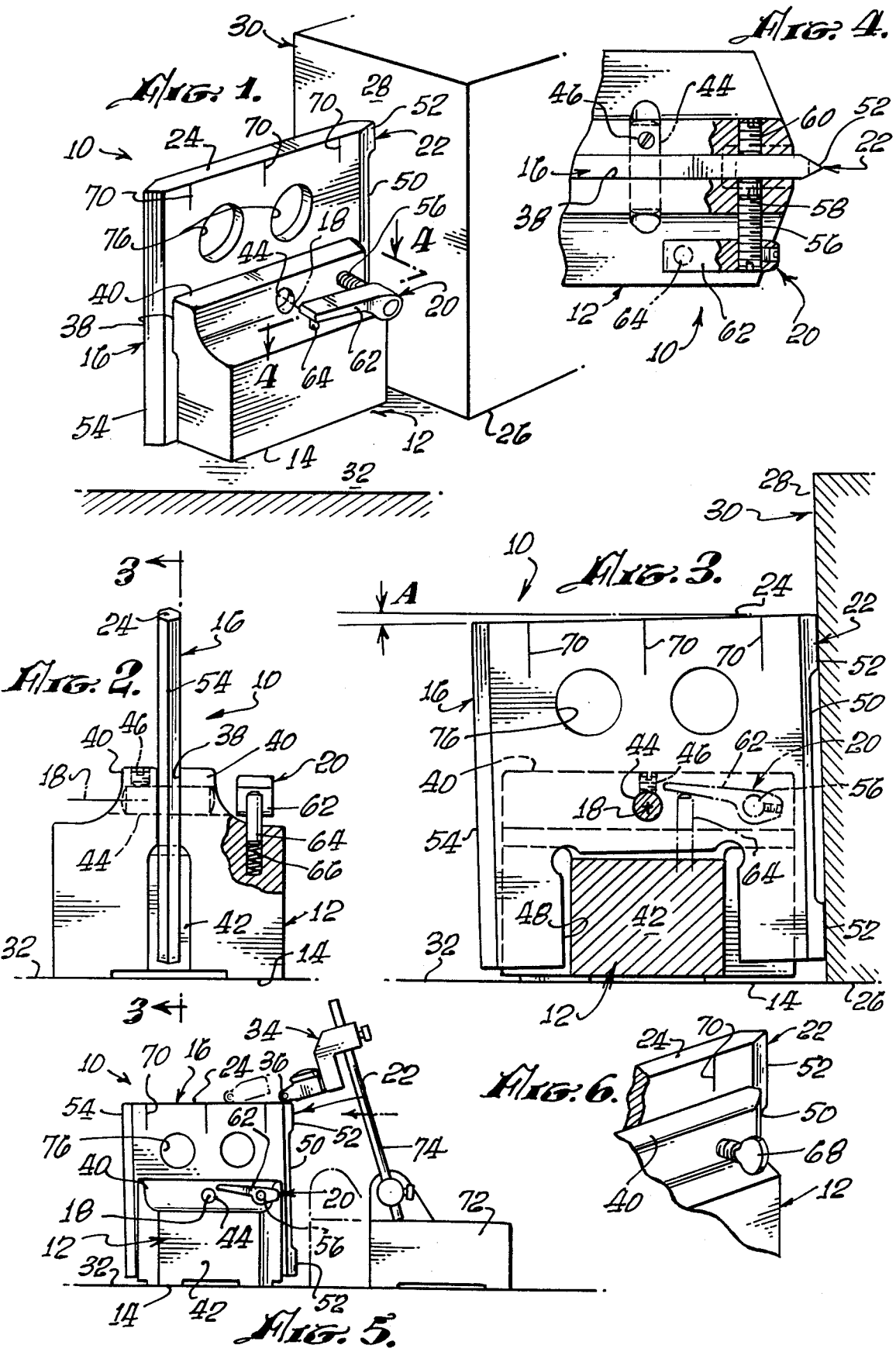

TRANSFER GAGE

BACKGROUND OF THE INVENTION

1. Field of the Invention

This invention relates generally to work gaging instruments for use by tool and die makers, machinists and the like. More particularly, the invention relates to a novel transfer gage for use in measuring the included angle between two relatively angularly disposed surfaces of a workpiece.

2. Prior Art

Many machining operations require gaging of two relatively angularly disposed surfaces of a workpiece to determine their relative angular relation or included angle. For example, it is often essential that two such surfaces be precisely "square", that is perpendicular to one another or that two work surfaces be parallel to one another and square to a third surface.

A variety of gaging instruments have been designed to measure the relative angle of two work surfaces, to determine whether these surfaces are "square" with one another, for example. One instrument of this kind, for instance, is sold under the trade name SquareMaster by PMC Industries of Cleveland, Ohio. This instrument has an upstanding column-like base and a dial gage supported on the base for vertical movement therealong. In use the gaging instrument and a workpiece are placed on a supporting surface, such as a precision surface plate with one surface of the workpiece resting on the supporting surface. The dial gage is then moved vertically along the instrument base with the gage plunger in contact with the other workpiece surface to obtain dial gage readings from which may be determined the angle between the two workpiece surface or the "squareness" of these surfaces.

While these existing gaging instruments are satisfactory from the standpoint of gaging accuracy, they are relatively costly and complex. Accordingly, there is a need for an improved gaging instrument and technique for the purpose described.

SUMMARY OF THE INVENTION

This invention provides such an improved gaging technique and a gaging instrument for its practice. For reasons which will become evident as the description proceeds, this gaging instrument is referred to herein as a transfer gage.

The transfer gage has a base member with a flat base surface and pivotally mounting a transfer gage member on pivot axis parallel to the base surface. This transfer gage member has a first linear work engaging edge means and a second linear gaging edge located in planes parallel to the pivot axis and disposed in precise known angular relation. The transfer gage member of the preferred transfer gage described, for example, comprises a generally rectangular plate which is received within a slot in the base member normal to its base surface and is pivoted on the base member on a pivot axis normal to the plate. The upper edge and one side or end edge of this plate constitute the gaging edge and work engaging edge means, respectively, and are mutually perpendicular. Means are provided for releasibly locking the transfer gage member in fixed angular position about its pivot axis.

In use the transfer gage and the workpiece to be gaged are placed on a flat supporting surface, such as a precision surface plate of the kind used by tool and die makers and the like, with the base surface of the gage base member and one surface of the workpiece resting on the supporting surface. The work engaging edge means of the gage member is placed flat against the other workpiece surface. The angle between the gaging edge of the gage member and the supporting surface then bears a known relation to the included angle between the two workpiece surfaces. This gaging edge angle is measured in any convenient way and used to determine the included angle between the work surfaces. In the described gaging practice, for example, the gaging edge angle is measured by supporting a dial gage at a fixed elevation above the supporting surface with the dial gage plunger in contact with the upper gaging edge of the transfer gage plate, and the dial gage is moved along the edge from one end to the other. The difference in dial gage readings between these ends may be used to determine the angle of the work surfaces.

BRIEF DESCRIPTION OF THE DRAWINGS

FIG. 1 is a perspective view of a preferred transfer gage according to the invention showing the gage in gaging position relative to a workpiece;

FIG. 2 is an end elevation of the gage;

FIG. 3 is a section taken on line 3—3 in FIG. 2;

FIG. 4 is an enlarged section taken on line 4—4 in FIG. 1;

FIG. 5 illustrates, on reduced scale, a measuring step involved in the present transfer gaging technique; and FIG. 6 is a fragmentary perspective view illustrating a modification of the invention.

DESCRIPTION OF THE PREFERRED EMBODIMENT

The preferred transfer gage 10 illustrated in the drawings comprises a base member 12 having a flat base surface 14 and pivotally supporting a transfer gage member 16 on a pivot axis 18 parallel to the base surface. Means 20 are provided for releasibly locking the gage member in fixed angular position about its pivot axis.

Transfer gage member 16 has a linear work engaging edge means 22 and a linear gaging edge 24. These edges are located in planes parallel to the pivot axis 18 and disposed at a precise known angle relative to one another. Preferably, this angle is 90°, as shown.

Briefly in use of the transfer gage 10 to determine or gage the included angle between two relatively angularly disposed surfaces 26 and 28 of a workpiece 30, the gage and workpiece are placed on a flat supporting surface 32, such as a precision surface plate of the kind referred to earlier, with the base surface 14 of the gage base member 12 and one surface 26 of the workpiece resting on the supporting surface. The work engaging edge means 22 of the gage member 16 is then pressed flat against the other work surface 28 with the pivot axis 18 substantially parallel to the latter surface.

Under these conditions, the angle A between the gaging edge 24 of the transfer gage member 16 and the supporting surface 32, or more correctly between the edge and a plane parallel to the supporting surface, bears a known relation to the included angle between the work surfaces 26, 28. In the particular transfer gage illustrated, for example, the angle A is a measure of the deviation of the included work angle from a right angle. In other words, the angle A is a measure of the deviation of the work surfaces from "square".

The angle A is measured in any convenient way. The preferred method of this angle measurement is illustrated in FIG. 5. According to this method, a dial gage 34 is supported at a fixed elevation above the supporting surface 32 with its plunger 36 in contact with the gaging surface 24 of the transfer gage member 16. The dial gage is then moved along the gaging surface from one end to the other to obtain readings from which the angle A may be determined. Obviously, if the purpose of the gaging operation is merely to determine whether the workpiece 30 is "square", i.e. the work surfaces 26, 28 are perpendicular to one another, it is necessary only to observe whether the dial gage 34 indicates any change in reading along the gaging edge 24. In other words if the workpiece is "square", the dial gage reading will remain constant along the edge.

Referring in more detail to the drawings, the transfer gage base member 12 has a block-like configuration containing a slot 38 normal to its base surface 14. The upper side of the base member is recessed at opposite sides of this slot to form a pair of relatively narrow base portions 40 at opposite sides of the slot. The end portions of slot 38 open downwardly through the underside of the base member, while the intervening central portion of the slot extends only part way through the base member, thus forming at the bottom of the slot, between its ends, a rectangular formation 42 bridging the slot.

The transfer gage member 16 is a rectangular case hardened plate which fits in the base slot 38 with a relatively narrow clearance. This plate is pivoted on the base member 12 by a pivot pin 44 which extends rotatably through the approximate center of the plate, normal to its plane, and through bores in the upper base portions 40. A set screw 46 locks the pivot pin in position. Entering the lower edge of the plate 16 is a rectangular cutout 48 which provides clearance for the base formation 42. This cutout is somewhat larger than the base formation to permit limited pivotal movement of the plate, and cooperates with the formation to provide a limit stop means for pivotal movement of the plate.

The upper edge of the transfer gage plate 16 is a flat surface lying in a plane parallel to the pivot axis 18 and constitutes the gaging edge 24. The right hand orthogonal edge of the plate is recessed at 50 between its ends to provide two spaced edge portions 52 which together constitute the work engaging edge means 22 of the plate. These edge portions are preferably tapered to sharp edges, as shown best in FIG. 1. In the particular embodiment shown, the gage plate 16 has a second orthogonal work engaging edge 54 opposite and parallel to the edge means 22. This second edge is continuous and beveled to a sharp edge, as shown.

As noted earlier, gage 10 has locking means 20 for the transfer gage member or plate 16. This locking means comprises a lock screw 56 threaded in one of the base portions 40, normal to the slot 38. At the inner end of screw 56 is a case hardened pad or button 58 which may be forced against one side of plate 16 by the screw. Threaded in the other base portion 40, opposite the lock screw 56, is a case hardened stop screw 60 whose inner end is located close to or in light sliding contact with the plate 16. Thus, the plate may be locked in position by threading the lock screw 56 inwardly to clamp the plate between the button 58 and stop screw 60.

On the outer end of lock screw 56 is an arm-like handle 62. A pin 64, slidable in a bore in the base member 12, is urged upwardly by a spring 66 against the handle 62 to urge the lock screw to plate locking position. The plate is released to pivot freely by depressing the handle and thereby retract the lock screw against the action of spring 66. If desired, a simple wing screw 68 may be used as a lock screw as shown in FIG. 6.

In use of the transfer gage 10, then, the gage and workpiece 30 are placed on the supporting surface 32, as described earlier, with the gage plate 16 released to pivot free and one work engaging edge means 22 or 54 of the plate in contact with the exposed work surface 28. The dial gage 34 is then run along the gaging edge 24 of the transfer gage plate 16 to gage the angle A which, as noted earlier, is related to the included angle between the work surface 26, 28. To permit actual measurement of this angle, index lines 70 with a precise spacing may be located along the edge 24. The difference in dial gage reading between any two of these lines together with the known spacing between the lines may then be used to calculate the angle A. When taking the dial gage reading, of course, the gage plate 16 is locked in position.

As shown in FIG. 5, the dial gage 34 is mounted on a heavy base 72 by means of an adjustable support 74 which can be secured in position to locate the gage at a fixed elevation above the supporting surface 32. The gage is then moved along the gage plate gaging edge 24 by sliding the base 72 along the surface 32. For convenience, the gage plate 16 may have finger holes 76 for carrying the gage.

The invention claims:
1. A transfer gage comprising:
a base member having a planar base surface and a slot entering the upper side of said base member in a plane normal to said base surface,
a flat rectangular gage plate disposed in said slot with the lower plate edge entering said slot and with said plate projecting edgewise above said base member and beyond at least one side of said base member,
means pivotally mounting said gage plate on said base member on a pivot axis normal to the plate and parallel to said base surface,
said base having a limit stop formation entering a recess in said lower gage plate edge to limit pivotal movement to said gage plate,
said gage plate having a top gaging edge disposed above said base and a side work engaging edge perpendicular to said top edge and disposed beyond said one side of said base, said side edge having a recess between its ends, and
means for releasably locking said gage plate to said base member in fixed angular position about said pivot axis, said locking means comprising a lock screw threaded in said base member for locking engagement against said gage plate, a spring for urging said screw to locking position, and a handle on said lock screw for releasing said screw against the action of said spring.
2. A transfer gage according to claim 1 wherein:
said locking screw is threaded in a hole in said base opening through one side of said slot to exert a locking force against one side of said plate, and said locking means further comprise a thrust member on said base slidably engaging the other side of said plate opposite said screw, a spring for urging said screw to locking position and a handle on said screw for releasing said screw against the action of said spring.

* * * * *